T. E. MURRAY.
ELECTRICALLY WELDED TUBE AND FLANGE PLATE.
APPLICATION FILED NOV. 29, 1916.
1,215,967.
Patented Feb. 13, 1917.
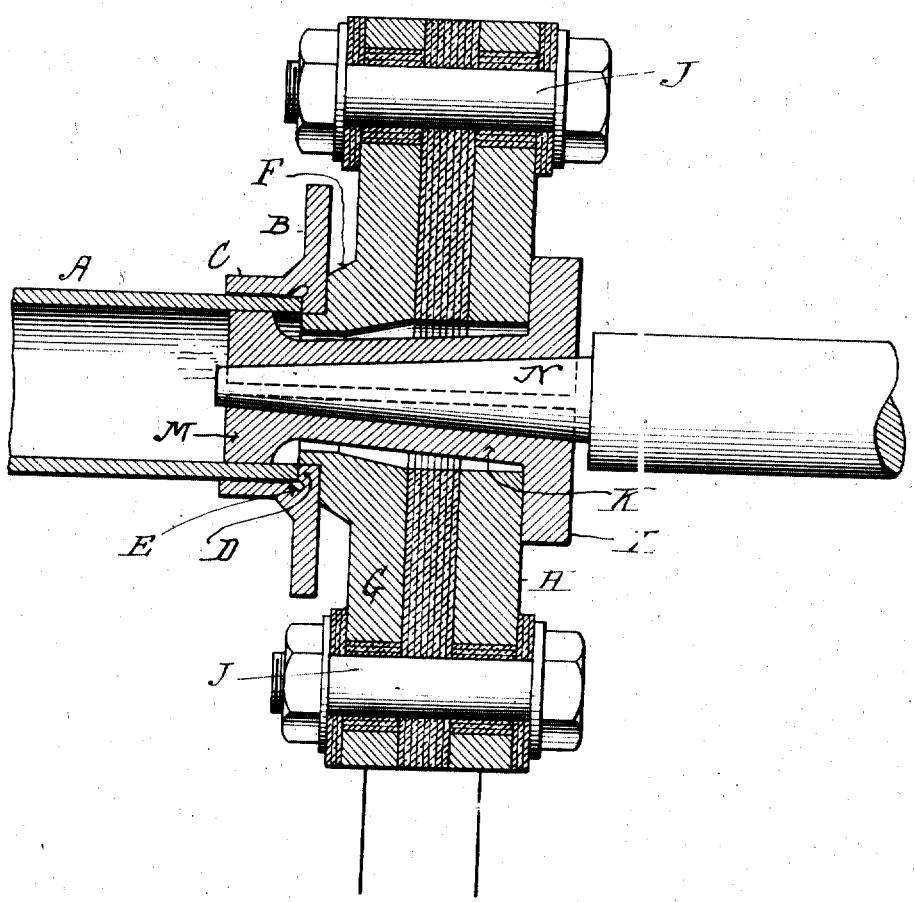
Inventor
Thomas E. Murray
By his Attorney
Park Benjamin

UNITED STATES PATENT OFFICE.

THOMAS E. MURRAY, OF NEW YORK, N. Y.

ELECTRICALLY-WELDED TUBE AND FLANGE-PLATE.

1,215,967.

Specification of Letters Patent. Patented Feb. 13, 1917.

Application filed November 29, 1916. Serial No. 134,007.

*To all whom it may concern:*

Be it known that I, THOMAS E. MURRAY, a citizen of the United States, residing at New York, in the county of New York and State of New York, have invented a certain new and useful Improvement in Electrically-Welded Tubes and Flange-Plates, of which the following is a specification.

The invention relates to an electrically welded tube and flange plate, and consists in the construction whereby the end of the tube is received in a socket on said flange plate and welded to said plate at its butt end, and also in the means for increasing the area of the welded joint, and for locking said joint by the metal extruded during the welding operation.

The accompanying drawing is a longitudinal section of a tube and a flange plate to be welded thereon, the said tube and plate being shown in position in the electrodes of a welding machine.

A is the tube, to the end of which the flange plate B is to be electrically welded. On said plate is a preferably integral sleeve C, in which the tube A fits. The sleeve C thus forms a socket for the end of the tube, in which socket is a shoulder, here in the form of a circular rib D, which registers with the butt end of the tube. Said rib is here produced by the circular recess E in the flange plate B, but I may make it in other ways.

The welding electrodes are preferably constructed as follows. The flange plate B is seated in a shoulder formed in a central projection F on the annular electrode G, which is connected to one terminal of the lead from the source of welding current. An annular plate H connected to the other terminal is secured to electrode G by bolts J. Said bolts are insulated from electrode G and plate H, and said electrode and said plate are insulated from one another in any suitable way.

A tubular electrode K, formed in two longitudinally divided half sections, as shown in dotted lines, is placed in the central openings in plate H and electrode G. On one end of said electrode is a flange L, which bears against plate H, and on the other end is a flange M, which enters the tube A. The opening in electrode K is tapered and receives a tapered mandrel N which, on being driven in, causes said sections to separate and the electrode to expand, so that the tube wall is tightly clamped between flange L and sleeve C.

When the welding current is established, the end of tube A and the rib D are welded together. The recess E receives the fluid metal, or a substantial part of it, extruded at the joint, so that the recess surfaces, and the outer surface of the tube covered by said recess, are added to the normal joint surfaces to increase the welded area, and also a locking joint is formed by the metal entering said recess; so that the whole resulting joint is exceedingly strong.

The electrodes are made of any suitable metal, preferably copper. The sleeve C is to be insulated from the tube A by any suitable material applied in fluid condition—as a coating to the tube or to the interior of the sleeve.

I claim:

1. A tube, a flange plate having an opening registering with the bore of said tube, and a sleeve on said plate receiving said tube; the end of said tube being welded to said flange plate.

2. A tube, and a flange plate having an internally shouldered socket receiving said tube; the end of said tube being welded to the shoulder in said socket.

3. A tube, a flange plate having an opening registering with the bore of said tube, and a circular rib on said plate surrounding said opening; the end of said tube being welded to said rib.

4. A tube, a flange plate having an opening registering with the bore of said tube, and a sleeve on said plate receiving said tube; the end of said tube within said sleeve being welded to said flange plate, and there being an internal circular recess in said flange plate and sleeve surrounding the joint between said tube end and said plate.

5. A tube, a flange plate welded to said tube, and means for locking said tube to said plate by molten metal extruded from the welded joint between said tube and said plate.

6. A tube, a flange plate welded to the end of said tube, and a tubular projection on said plate receiving said tube, and having in its inner periphery a cavity in proximity to the joint between said tube and said flange plate for receiving molten metal extruded from said joint.

In testimony whereof I have affixed my signature in presence of two witnesses.

THOMAS E. MURRAY.

Witnesses:
 GERTRUDE T. PORTER,
 MAY T. MCGARRY.